April 22, 1952  C. B. IVES  2,593,564
PILOT OPERATED VALVE
Filed Nov. 16, 1944  2 SHEETS—SHEET 2
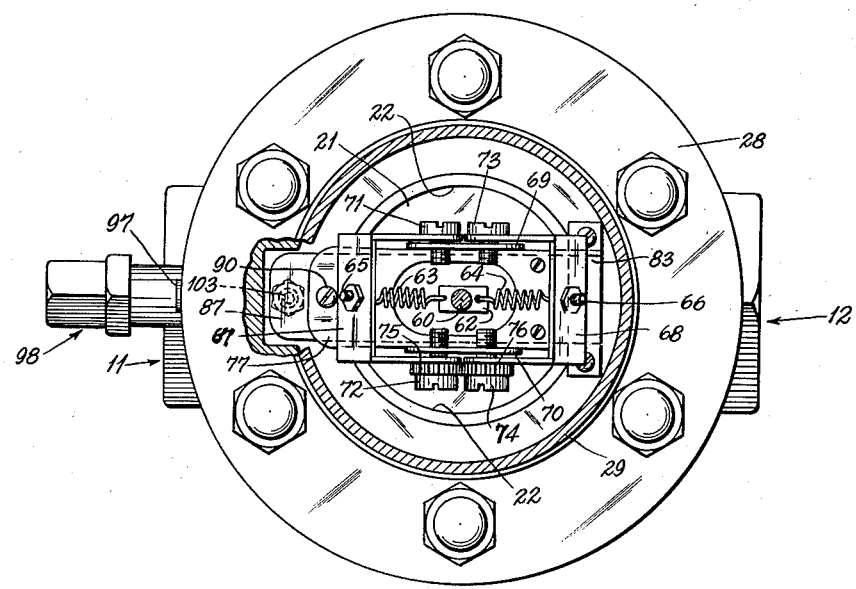
INVENTOR:
CLIFFORD B. IVES,
ATTORNEYS.

Patented Apr. 22, 1952

2,593,564

UNITED STATES PATENT OFFICE 2,593,564

PILOT OPERATED VALVE

Clifford B. Ives, St. Louis County, Mo., assignor to Alco Valve Company, University City, Mo., a corporation of Missouri Application November 16, 1944, Serial No. 563,646

14 Claims. (Cl. 137—153)

The present invention relates to a pilot operated valve. More particularly, it comprises a pilot operated temperature or pressure-responsive regulator having means to adjust the pilot valve in accordance with movement of the main valve operating means.

An object of the invention is to provide a pressure-responsive valve mechanism having a pilot valve, a main valve and a pressure-responsive means to operate the main valve in response to operation of the pilot valve, together with resilient means interposed between the pilot valve and the main valve normally urging them oppositely, arranged to reduce the urging force as the main valve operates.

A further object is to provide a structure as aforesaid in which a throttling means for the pilot valve is caused to move toward throttling position as a function of movement of the main valve toward opening position. A further object is to provide a structure as aforesaid in which the throttling means is operated by an external control such as a pressure- or temperature-responsive means; together with means to adjust the movement of the pilot valve per unit change in the responsive means.

A further object is to provide a valve such as the foregoing which is compact in structure, and which contains various additional objects to appear in the following description.

In the drawings:

Fig. 2 is a horizontal section taken on the line 2—2 at approximately the middle of Fig. 1.

Figure 1:
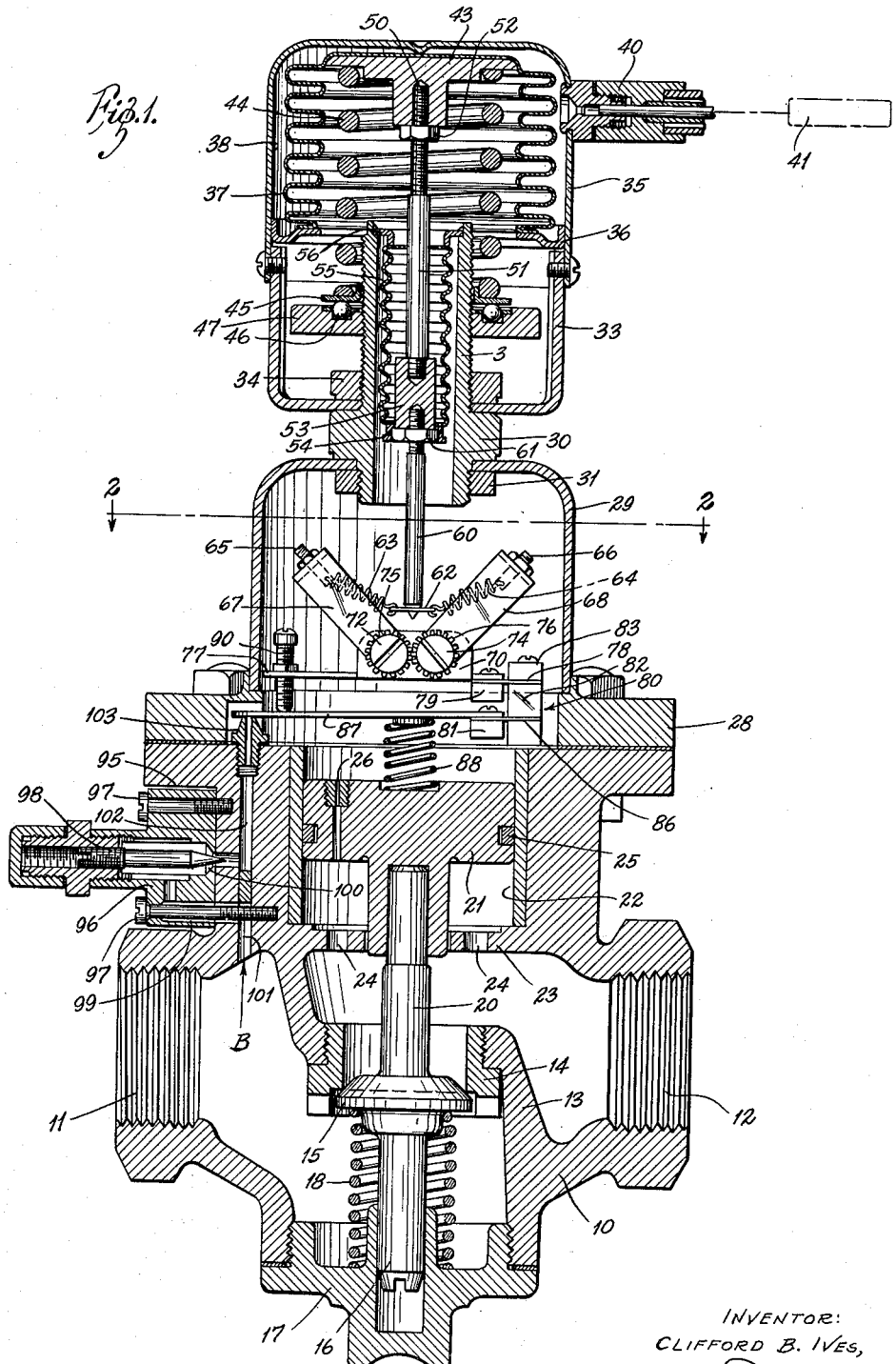
Fig. 1 is a vertical section through the valve mechanism.

The valve has a valve body 10, providing an inlet 11 and an outlet 12. A partition 13 between the inlet and the outlet has a valve seat insert 14 therein, against which a valve head or member 15 may seat to cut off flow between the inlet 11 and the outlet 12, and may open to permit such flow. A guide pin 16, slidable in a plug 17 removably screwed into the bottom of the valve housing 10, guides the movement of the valve. A coil spring 18 urges the valve toward closed position.

A valve stem 20 supports the valve head 15 and is attached at its upper end to a piston 21 reciprocable in a cylinder 22 formed within the valve housing and lined as shown. The cylinder 22 below the piston 21 is separated from the outlet 12 by a partition wall 23, but this partition wall has ports 24 to establish communication with the outlet. Suitable piston ring means 25 may be employed to seal the piston 21 against the walls of the cylinder. A restricted port 26 is provided through the piston 21 to permit a delayed equalization of the pressure above and below the piston.

A cover holding ring 28 is attached to the top of the valve housing 10 in sealing relation. A cup-like cover 29 is sealed to the ring 28. This cover 29 has a connector 30 extending through and attached to the top thereof by a nut 31 within the cover. The upper end 3 of the connector 30 extends for a considerable length and is externally threaded.

A bellows housing yoke 33 is fitted over the extension 3 and held by a nut 34. The yoke 33 supports an upper element 35 in the shape of an inverted cup. A flanged ring 36 is fixed in the lower part of the cup 35 and has sealed thereto the bottom of a bellows 37, thus providing within the cap 35 and outside the bellows 37 a pressure chamber 38. This pressure chamber has a fitting 40 having a tubular connection to a bulb 41, the bulb being adapted to contain an expansion fluid preferably of the vaporizing type. It is obvious that the motor means could be other than temperature-responsive. Pressure operation is mentioned as a clear alternate.

Within the upper part of the bellows is a pressure plate 43 normally urged upward by a spring 44 engaging the plate 43 and engaging a washer 45 at its other end. This washer fits over the extension 32 and rests against ball bearings 46 supported in a plate 47 that is threaded over the extension 3. Rotation of the disc 47 on the extension 32 adjusts the force of the spring 44, the adjustment being facilitated by the ball bearings 46 which provide for free rotation of the disc 47 relative to the spring 44, the latter being held against rotation.

The head 43 receives the upper threaded end 50 of a pin 51. An adjusting nut 52 determines the effective length of the pin 51. This pin projects down into the extension 32 and is secured to a connector 53. This connector has a cup-shaped head 54 to which is attached a lower end of a bellows 55. This bellows is open at its upper end but its upper edges are secured to a flanged member 56 secured into the upper end of the extension 3. The bellows seals the interior of the housing member 29 from atmosphere.

A pin 60 is threaded into the bottom of the connector 53 and secured adjustably thereto by a lock nut 61. This pin extends down into the member 29 and has a tapered lower end engaging in a suitable opening in a small plate 62. This plate receives the opposite ends of coil spring 63 and 64, the outer ends of which are respectively secured to screws 65 and 66 that are adjustably threaded into yoke members 67 and 68. The yoke members 67 and 68 are adjustably attached to flanges 69 and 70, there being screws 71 and 72 to attach the yoke 67, and screws 73 and 74 to attach the yoke 68, with suitable friction washers. The two screws 72 and 74 pass through interengaging gears 75 and 76 on the yokes 67 and 68, respectively, so that the yokes 67 and 68 will be caused to rock together.

The flanges 69 and 70 are turned up on the sides of a lever 77. This lever 77 is attached to a bronze spring pivot 78 by screws passing through the lever and attached into a block 79. The spring 78 is, in turn, secured to a post, generally indicated at 80. This post is made up of a lower spacer, a middle spacer 82, and a top clamping bar 83. Screws pass through the spacer blocks and into the upper edge of the main housing 10.

Between the lower spacer and the middle spacer 82 is an additional bronze spring pivot 86 that is clamped at its outer end to a valve member 87 in the form of a lever. A loaded coil spring 88 acts between the piston 21 and the valve lever 87 to urge them apart. This spring urges the valve lever 87 upwardly against an abutment screw 90, adjustably mounted in the operating lever 77.

The valve member 87 controls flow through a bleeder port from the inlet 11 to the top side of the piston 21. This port is generally indicated at B, and is adjustable by a needle valve. To this end, the main housing 10 has a cutout 95 indented in the wall thereof adjacent the inlet 11. A valve assembly is installed in this cutout. It includes a valve block 96 attached by screws 97 to the main housing 10. Within the block is a needle valve 98 adjustably controlling flow from an inlet port 99 to an outlet 100. It will be seen that the inlet port is formed as part of the opening receiving one of the screws 97.

The inlet 99 registers with a port 101 leading from the main inlet 11. The outlet 100 registers with a port 102 leading to the nozzle 103, the latter being cooperable with the valve member 87 so that the flow through the bleeder port is controlled by the position of the valve member 87 relative to the nipple.

*Operation*

It will be seen that the valve lever 87 is acted upon by an upward force of the spring 88. The force of this spring is determined by the amount of its compression, and, therefore, is at maximum when the piston 21 is up, the main valve 15 closed, and when the valve 87 is down against the nipple 103. This is the cut-off position of the mechanism.

Under these conditions, the valve 87 is acted on by a downward force originating in the gas pressure in the chamber 38, compressing the bellows 37. This force produces a movement that is transmitted downwardly to the lower pin 60 and into the plate 62. A given change in bellows pressure produces a given amount of downward movement of the pin 60. At the plate 62, the movement is divided and reduced, by the two angular springs 63 and 64, which produce a downward movement less than that in the pin 60. The amount of the downward movement of the flanges 69 and 70 per unit downward movement of the pin 60 is a function of the angular adjustment of the yokes 67 and 68. As the yokes are moved more toward the vertical, the downward component increases.

The ultimate downward component is applied directly to the lever 77, and by it, through the screw 90, is applied to the valve lever 87.

Necessarily, to close the valve 87, the downward force must exceed the maximum upward force of the spring 88. Adjustment of the angularity of the yokes 67 and 68 changes the amount of downward force applied to the valve, for each individual downward movement of the bellows head 43, and, therefore, changes the amount of movement of the valve 87 per unit change in bellows pressure. The length of the connecting pins 51—53—60 is determined by the initial assembly of the mechanism to obtain suitable disposition of the parts.

At the start, the valves 15 and 87 will be closed. The pressure in the chamber 38 will be relatively high, the bellows 37 contracted, and the pins 51 and 60 in a downward position. At the point immediately prior to opening of the pilot valve 87, the springs 63 and 64 will be exerting a downward force component against the pilot valve, and this is opposed by the force of the spring 88.

If pressure in the chamber 38 decreases, the pins 51 and 60 will move upwardly, incrementally. This will reduce the force opposing the spring 88, which thereby will lift the valve 87 toward open position, admitting line pressure fluid to the chamber 29 above the piston 21. As the lower side of the piston is acted upon by relatively low pressure, the piston will be moved downward, opening the main valve 15. But as the piston 21 descends, the upward force of the spring 88 is reduced. As a result of a combination of the descent of the piston and the elevation of the valve 87, the force of the spring 88 is caused to be reduced to a point to balance the downward force of the springs 63 and 64. Hence the piston 21 and valve 15 are caused to assume a position that is a function of the position of the pin 60 and ultimately a function of the pressure in the chamber 38 or position of the power means.

If the piston tends to overtravel, it reduces the force of the spring 88 to below the downward force of the springs 63 and 64. This throttles the pilot valve, by moving it toward closed position, and the force acting against the upper side of the piston is reduced. Hence overtravel is prevented.

Oppositely, if the pressure in the chamber 38 is increased, the pin 60 will be lowered. This increases the downward force of the springs 63 and 64, causing the pilot valve to be moved toward closed position, throttling flow into the chamber 29, and reducing the pressure therein. The piston will rise until it reaches a new position wherein the force of the spring 88 is increased to counterbalance the downward force of the springs 63 and 64. The pilot valve 87 may be entirely closed, in which event the pressures above and below the piston 21 equalize through the port 26, and the spring 18 closes the valve.

As already explained, adjustment of the angular position of the yokes 67 and 68 changes the amount of movement of the piston for given movements of the bellows. The mechanism is initially set with the rods 51 and 60 of suitable length, and may be readily calibrated for ordinary changes by adjustment of the screw 90, to set the position of the bellows at which the valve opens. The needle valve 98 is adjustable to set the rate of operation of the piston when the pilot valve is open. The wider open the valve 98, the more quickly the piston will respond to admission of pressure to the chamber 29 by opening of the pilot valve.

What is claimed is:

1. In a valve apparatus, a valve housing having an inlet and an outlet, valve operating mechanism including a main valve and fluid pressure-responsive motive means for operating the valve, a conduit connecting one side of the motive means to the inlet, a pilot valve for controlling said conduit whereby the main valve is opened when the pilot valve is opened admitting inlet pressure to the motive means, a yieldable connection between the pilot valve and the valve operating mechanism, including a spring under compression normally urging both the main valve and the pilot valve open, power means to operate the pilot valve, said power means including a yieldable member opposed to the action of the compression spring, but operable to permit the pilot valve to open under force of the spring, and the main valve to be opened as a consequence, opening of the main valve being adapted to reduce the pressure of said spring.

2. In a valve apparatus, a valve housing having an inlet and an outlet, valve operating mechanism including a main valve and fluid pressure-responsive motive means for operating the valve, a conduit connecting one side of the motive means to the inlet, a pilot valve for controlling said conduit whereby the main valve is opened when the pilot valve is opened admitting inlet pressure to the motive means, a yieldable connection between the pilot valve and the valve operating mechanism, including a spring under compression normally urging both the main valve and the pilot valve open, power means to operate the pilot valve, said power means including a yieldable member opposed to the action of the compression spring, but operable to permit the pilot valve to open under force of the spring, and the main valve to be opened as a consequence, opening of the main valve being adapted to reduce the pressure of said spring, and means to adjust the amount of movement of the pilot valve for each increment of movement of the power means.

3. In a valve apparatus, a valve housing having an inlet and an outlet, valve operating mechanism including a main valve and a pressure-responsive motive means for operating the valve, a conduit connecting the inlet to one side of the motive means, a pilot valve for controlling said conduit whereby the main valve is opened when the pilot valve is opened, resilient power means to operate the pilot valve by application of yieldable force thereto, spring means under normal compressive load interposed between the motive means and the pilot valve, and normally urging them apart, said pilot valve being urged toward open position by said spring, said power means being adapted to produce force exceeding the spring to close the pilot valve, and movable to reduce said force to permit the spring to open the pilot valve, opening of the pilot valve admitting inlet pressure to the motive means to urge it away from the pilot valve to cause it to open the main valve, and to reduce its compressive force against the pilot valve.

4. In a valve apparatus, a valve housing having an inlet and an outlet, valve operating mechanism including a main valve and a pressure-responsive motive means for operating the valve, a conduit connecting the inlet to one side of the motive means, a pilot valve for controlling said conduit whereby the main valve is opened when the pilot valve is opened, resilient power means to operate the pilot valve by application of yieldable force thereto, said power means including a movable power device and a resilient spring means interposed between the device and the pilot valve, said spring means being adapted to modify the force against the pilot valve produced by movement of the device, a second spring means under normal compressive load interposed between the motive means and the pilot valve, and normally urging them apart, said pilot valve being urged toward open position by said second spring, said power means being adapted to produce force exceeding the second spring to close the pilot valve, and movable to reduce said force to permit the second spring to open the pilot valve, opening of the pilot valve admitting inlet pressure to the motive means to urge it away from the pilot valve to cause it to open the main valve, and to reduce its force against the pilot valve through said second spring.

5. In a valve apparatus, a valve housing having having an inlet and an outlet, valve operating mechanism including a main valve and a pressure-responsive motive means for operating the valve, a conduit connecting the inlet to one side of the motive means, a pilot valve for controlling said conduit whereby the main valve is opened when the pilot valve is opened, resilient power means to operate the pilot valve by application of yieldable force thereto, spring means under normal compressive load interposed between the motive means and the pilot valve, and normally urging them apart, said pilot valve being urged toward open position by said spring, said power means being adapted to produce force exceeding the spring to close the pilot valve, and movable to reduce said force to permit the spring to open the pilot valve, opening of the pilot valve admitting inlet pressure to the motive means to urge it away from the pilot valve to cause it to open the main valve, and to reduce its compressive force against the pilot valve, said power means including a power device movable in a predetermined direction, a spring between the device and the pilot valve, and means for adjustably disposing the spring at an angle to the direction of movement of the power device, whereby to adjust the force of the power means on the pilot valve, per increment of movement of the power device.

6. In a valve apparatus, a valve housing having an inlet, an outlet, and a main valve therebetween, a cylinder connected at one end to the outlet, a conduit leading from the inlet to the other end of the cylinder, a piston in the cylinder movable to open the valve when inlet pressure is admitted to the cylinder, bleeder means between the two ends of the cylinder, a pilot valve including a member extending across the inlet end of the cylinder and movable toward the piston to throttle the conduit, compressible force means interposed between the piston and the member to urge them apart with a force that lessens as the piston moves away to open the main valve, power means to operate the pilot valve including a yieldable force means operating against the member in opposition to the compressible force means.

7. In a valve apparatus, a valve housing having an inlet, an outlet, and a main valve therebetween, a cylinder connected at one end to the outlet, a conduit leading from the inlet to the other end, a piston in the cylinder movable to open the valve when inlet pressure is admitted to the cylinder, bleeder means between the two ends of the cylinder, a pilot valve including a member extending across the inlet end of the cylinder and movable toward the piston to throttle the conduit, compressible force means interposed between the piston and the member to urge them apart with a force that lessens as the piston moves away to open the main valve, power means to operate the pilot valve including a yieldable force means operating against the member in opposition to the compressible force means, said yieldable force means including a reciprocable element moved toward and from the pilot valve, a tension spring connected to the element at one point thereon, a link connected with the pilot valve and extending beyond the connection point, said tension spring being connected at its other end to the link, whereby when the reciprocable element is moved toward the pilot valve, it will draw the link and move the pilot valve.

8. In a valve apparatus, a valve housing having an inlet, an outlet, a main valve therebetween, a cylinder connected at one end to the outlet, a conduit leading from the inlet to the other end, a piston in the cylinder movable to open the valve when inlet pressure is admitted to the cylinder, bleeder means between the two ends of the cylinder, a pilot valve including a member extending across the inlet end of the cylinder and movable toward the piston to throttle the conduit, compressible force means interposed between the piston and the member to urge them apart with a force that lessens as the piston moves away to open the main valve, power means to operate the pilot valve including a yieldable force means operating against the member in opposition to the compressible force means, said yieldable force means including a reciprocable element moved toward and from the pilot valve, a tension spring connected to the element at one point thereon, a link connected with the pilot valve and extending beyond the connection point, said tension spring being connected at its other end to the link, whereby when the reciprocable element is moved toward the pilot valve, it will draw the link and move the pilot valve, said link being adjustable to vary the angle between the spring and the direction of movement of the reciprocable member.

9. In a valve apparatus, a valve housing having an inlet, an outlet, and a main valve therebetween, a cylinder connected at one end to the outlet, a conduit leading from the inlet to the other end, a piston in the cylinder movable to open the valve when inlet pressure is admitted to the cylinder, bleeder means between the two ends of the cylinder, a pilot valve including a member extending across the inlet end of the cylinder and movable toward the piston to throttle the conduit, compressible force means interposed between the piston and the member to urge them apart with a force that lessens as the piston moves away to open the main valve, power means to operate the pilot valve including a yieldable force means operating against the member in opposition to the compressible force means, said yieldable force means including a reciprocable element moved toward and from the pilot valve, a pair of tension springs, each connected at one end to the reciprocable member, a pair of links pivotally mounted at one end on the pilot valve, said links extending on opposite sides of the reciprocable member to beyond the connection point of the springs, and connected with the respective free ends of the springs whereby when the reciprocable element is moved toward the pilot valve, it will draw the links and move the pilot valve.

10. In a valve apparatus, a valve housing having an inlet, an outlet, and a main valve therebetween, a cylinder connected at one end to the outlet, a conduit leading from the inlet to the other end, a piston in the cylinder movable to open the valve when inlet pressure is admitted to the cylinder, bleeder means between the two ends of the cylinder, a pilot valve including a member extending across the inlet end of the cylinder and movable toward the piston to throttle the conduit, compressible force means interposed between the piston and the member to urge them apart with a force that lessens as the piston moves away to open the main valve, power means to operate the pilot valve including a yieldable force means operating against the member in opposition to the compressible force means, said yieldable force means including a reciprocable element moved toward and from the pilot valve, a pair of tension springs, each connected at one end to the reciprocable member, a pair of links pivotally mounted at one end on the pilot valve, said links extending on opposite sides of the reciprocable member to beyond the connection point of the springs, and connected with the respective free ends of the springs whereby when the reciprocable element is moved toward the pilot valve, it will draw the links and move the pilot valve, said links being angularly adjustable to vary the angular position between the tension springs and the reciprocable member.

11. In a valve apparatus, a valve housing having an inlet, an outlet, and a main valve therebetween, a cylinder connected at one end to the outlet, a conduit leading from the inlet to the other end, a piston in the cylinder movable to open the valve when inlet pressure is admitted to the cylinder, bleeder means between the two ends of the cylinder, a pilot valve including a member extending across the inlet end of the cylinder and movable toward the piston to throttle the conduit, compressible force means interposed between the piston and the member to urge them apart with a force that lessens as the piston moves away to open the main valve, power means to operate the pilot valve including a yieldable force means operating against the member in opposition to the compressible force means, said yieldable force means including a reciprocable element moved toward and from the pilot valve, a pair of tension springs, each connected at one end to the reciprocable member, a pair of links pivotally mounted at one end on the pilot valve, said links extending on opposite sides of the reciprocable member to beyond the connection point of the springs, and connected with the respective free ends of the springs whereby, when the reciprocable element is moved toward the pilot valve, it will draw the links and move the pilot valve, said links being angularly adjustable to vary the angular position between the tension springs and the reciprocable member, and means to cause the links to move in unison when either is angularly adjusted.

12. In a valve apparatus, a valve housing having an inlet, an outlet, and a main valve therebetween, a cylinder connected at one end to the outlet, a conduit leading from the inlet to the other end, a piston in the cylinder movable to open the valve when inlet pressure is admitted to the cylinder, bleeder means between the two ends of the cylinder, a pilot valve including a member extending across the inlet end of the cylinder and movable toward the piston to throttle the conduit, compressible force means interposed between the piston and the member to urge them apart with a force that lessens as the piston moves away to open the main valve, power means to operate the pilot valve including a yieldable force means operating against the member in opposition to the compressible force means, said yieldable force means including a lever pivoted to the valve housing and extending over the member, an adjustable abutment between the lever and the member for transmitting movements between them, a pair of arms pivotally adjustably mounted on the lever, a reciprocable power transmitting member extending between the free ends of the arms, and a spring extending from each arm to the reciprocable member.

13. In a valve mechanism, a valve housing having an inlet and an outlet, a main valve therebetween, a cylinder in the housing, a piston within the cylinder connected with the valve for operating the same, a bleeder port through the piston, one end of the cylinder being connected with the outlet and a conduit connecting the other end with the inlet, a pre-set valve controlling the conduit, a cover over the valve housing to close the top of the cylinder, said conduit opening into said cover, a pilot valve member adapted to close the conduit, extending across the cylinder above the piston, and pivoted to the valve housing, a compression spring between the pilot valve member and the piston, an operating member pivoted to the housing adjacent the pivot of the pilot valve member, an adjustable abutment between the pilot valve member and the operating member, a pair of yoke members pivotally attached at their ends to the operating member and extending upwardly therefrom, means to cause said yokes to pivot their extending parts toward and from each other in unison, means to secure the yokes in pivotally adjusted position, a spring attached to the extending part of each yoke and adjustably connected thereto, a power means including a reciprocable member extending into the cover and between the extending yokes, a plate across the end of the reciprocable member and attached to the ends of the two springs, a tubular attaching member extending through the top of the cover and projecting upwardly therefrom, a bellows housing mounted over the projecting part of the attaching member, a bellows in said housing, a spring having one end acting against said bellows, a plate receiving the other end of the spring, said plate surrounding the projecting part of the attaching member, a disc threaded onto said projecting part, ball bearings between the disc and the plate, and pressure conducting means to introduce fluid under pressure to operate the bellows.

14. In a valve apparatus, a valve housing having an inlet and an outlet, a valve seat therebetween, a main valve cooperable with said valve seat, pressure-responsive means for operating said valve, a first spring means urging said valve toward a closed position, a conduit connecting the inlet to one side of the pressure-responsive means, the other side being connected to the outlet, a pilot valve controlling passage through said inlet conduit, the pilot valve in open position causing the inlet pressure to actuate the pressure-responsive means and open the main valve, second spring means between the pilot valve and the pressure-responsive means urging the pilot valve toward an open position, and power means for operating the pilot valve, said power means including a device operated in response to changes in physical conditions that are external to the valve apparatus, and having a yieldable member acting in opposition to the second spring means and urging the pilot valve toward a closed position.

CLIFFORD B. IVES.

REFERENCES CITED

The following references are of record in the file of this patent:

UNITED STATES PATENTS

| Number | Name | Date |
|---|---|---|
| 975,283 | Roberts | Nov. 8, 1910 |
| 1,311,536 | Smoot | July 29, 1919 |
| 1,567,334 | Schieferstein | Dec. 29, 1925 |
| 2,264,677 | Oxland | Dec. 2, 1941 |
| 2,304,323 | Wiegers | Dec. 8, 1942 |
| 2,312,880 | Coffee | Mar. 2, 1943 |

FOREIGN PATENTS

| Number | Country | Date |
|---|---|---|
| 169,809 | Switzerland | Sept. 1, 1934 |
| 604,798 | Germany | Oct. 30, 1934 |

OTHER REFERENCES

Relay Devices and Their Application to the Solution of Mathematical Equations, vol. 11. Diagrams (Fig. 24), by The Askania Regulator Co., copyright 1940.